United States Patent
Witte

(10) Patent No.: US 10,654,458 B2
(45) Date of Patent: May 19, 2020

(54) ELECTRONIC BRAKE SYSTEM FOR A COMPRESSED AIR BRAKING SYSTEM OF A UTILITY VEHICLE

(71) Applicant: VOLKSWAGEN AKTIENGESELLSCHAFT, Wolfsburg (DE)

(72) Inventor: Bastian Witte, Gross Schwülper (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 0 days.

(21) Appl. No.: 15/543,984

(22) PCT Filed: Dec. 22, 2015

(86) PCT No.: PCT/EP2015/080937
§ 371 (c)(1),
(2) Date: Jul. 15, 2017

(87) PCT Pub. No.: WO2016/116241
PCT Pub. Date: Jul. 28, 2016

(65) Prior Publication Data
US 2018/0001879 A1    Jan. 4, 2018

(30) Foreign Application Priority Data

Jan. 22, 2015  (DE) .................. 10 2015 201 031

(51) Int. Cl.
*B60T 13/68* (2006.01)
*B60T 7/04* (2006.01)
(Continued)

(52) U.S. Cl.
CPC .......... *B60T 13/683* (2013.01); *B60R 16/033* (2013.01); *B60T 7/042* (2013.01);
(Continued)

(58) Field of Classification Search
CPC ...... B60T 13/683; B60T 13/26; B60T 15/027; B60T 8/171; B60T 7/042; B60T 2220/04; B60T 13/686; B60R 16/033
See application file for complete search history.

(56) References Cited

U.S. PATENT DOCUMENTS 4,574,908 A * 3/1986 Brick .................. B60T 7/22
                                        180/169
4,620,750 A * 11/1986 Leiber .................. B60T 8/266
                                        303/113.4
(Continued)

FOREIGN PATENT DOCUMENTS

CN      101879892 A     11/2010
DE      19947757 C1     1/2001
(Continued)

OTHER PUBLICATIONS

Search Report for International Patent Application No. PCT/EP2015/080937; dated Apr. 12, 2016.

*Primary Examiner* — Melody M Burch
(74) *Attorney, Agent, or Firm* — Barnes & Thornburg LLP

(57) ABSTRACT

An electronic brake system for a braking system of a utility vehicle having a brake encoder with at least one sensor for detecting positions of a brake pedal that is actuated by the driver of the utility vehicle and at least one valve that is mechanically actuated via the brake pedal, and which, as a result of the mechanical actuation, is moved from a pressure reduction position into at least one pressure-maintaining or pressure increase position, in which the valve admits at least one fluid flow for the actuation of at least one operating brake of the braking system, wherein the valve is assigned at least one control element that is different from the brake pedal, by which the valve is moved.

20 Claims, 3 Drawing Sheets

(51) Int. Cl.
*B60R 16/033* (2006.01)
*B60T 8/171* (2006.01)
*B60T 13/26* (2006.01)
*B60T 15/02* (2006.01)

(52) U.S. Cl.
CPC .............. *B60T 8/171* (2013.01); *B60T 13/26* (2013.01); *B60T 13/686* (2013.01); *B60T 15/027* (2013.01); *B60T 2220/04* (2013.01)

(56) References Cited

U.S. PATENT DOCUMENTS

| | | | | |
|---|---|---|---|---|
| 5,813,731 | A * | 9/1998 | Newman, II | B60T 13/665 188/106 F |
| 5,855,420 | A * | 1/1999 | Lawrence | B60T 8/4872 188/356 |
| 6,033,037 | A * | 3/2000 | Eckert | B60T 8/4854 303/113.2 |
| 6,033,039 | A * | 3/2000 | Dieringer | B60T 8/3275 303/113.3 |
| 6,186,601 | B1 * | 2/2001 | Linden | B60T 7/042 303/113.1 |
| 2001/0045771 | A1 * | 11/2001 | Corio | B60T 8/1703 303/20 |
| 2006/0017317 | A1 | 1/2006 | Howell et al. | |
| 2007/0048869 | A1 * | 3/2007 | Lee | C23C 16/45525 436/55 |
| 2011/0295468 | A1 * | 12/2011 | Crombez | B60T 7/042 701/48 |
| 2013/0320751 | A1 | 12/2013 | Eberling et al. | |

FOREIGN PATENT DOCUMENTS

| | | |
|---|---|---|
| DE | 10129604 A1 | 1/2003 |
| DE | 10320608 A1 | 12/2004 |
| DE | 10357373 A1 | 7/2005 |
| DE | 102005062907 B3 | 5/2007 |
| EP | 1000830 A2 | 5/2000 |
| EP | 1767421 A1 | 3/2007 |
| GB | 2100816 A | 1/1983 |

\* cited by examiner

ELECTRONIC BRAKE SYSTEM FOR A COMPRESSED AIR BRAKING SYSTEM OF A UTILITY VEHICLE

PRIORITY CLAIM

This patent application is a U.S. National Phase of International Patent Application No. PCT/EP2015/080937, filed 22 Dec. 2015, which claims priority to German Patent Application No. 10 2015 201 031.7, filed 22 Jan. 2015, the disclosures of which are incorporated herein by reference in their entirety.

SUMMARY

Illustrative embodiments relate to an electronic brake system for a braking system, in particular, a pneumatic braking system or a hydraulic power braking system of a utility vehicle.

BRIEF DESCRIPTION OF THE DRAWINGS

Disclosed embodiments will be described in connection with the figures, in which.

In the figures, identical or functionally equivalent elements are provided with the same reference characters.

DETAILED DESCRIPTION OF THE DISCLOSED EMBODIMENTS

Figure 1:
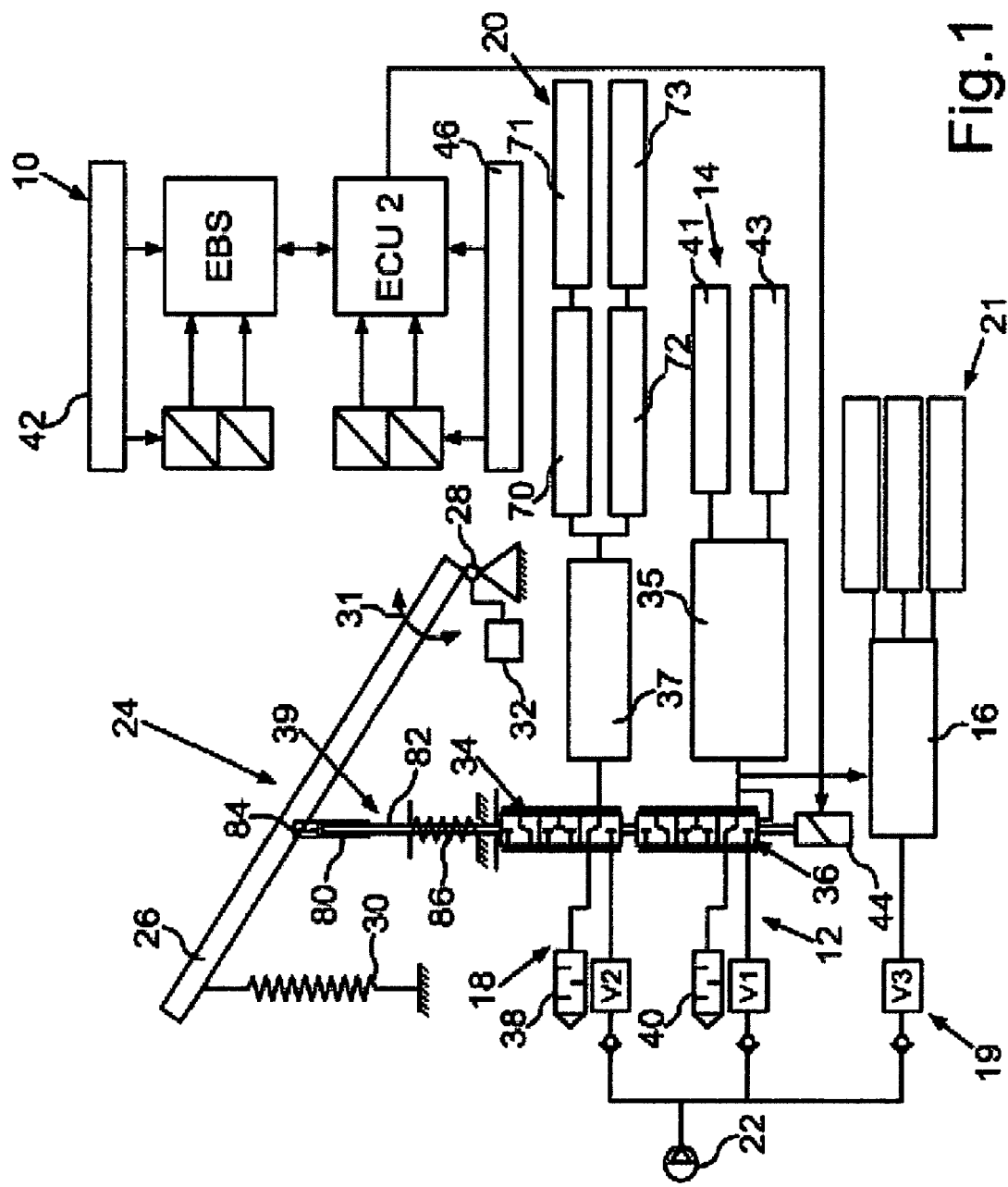
FIG. 1 shows a schematic representation of an electronic brake system for a pneumatic braking system of a utility vehicle with a braking value encoder, which comprises at least one sensor for detecting positions of a brake pedal operated by the driver of the utility vehicle and at least one valve mechanically actuated by means of the brake pedal, which as a result of the mechanical actuation can be moved from a pressure reduction position into at least a pressure maintenance position and/or a pressure build-up position, in which the valve passes at least one compressed air flow for actuating at least one service brake of the pneumatic braking system, wherein at least one final control element, by means of which the valve can be moved and that is different from the brake pedal, is associated with the valve.

Such electronic brake systems for braking systems, in particular, pneumatic braking systems or hydraulic power braking systems, of utility vehicles have already long been known from the general prior art and in particular from series production vehicles. Usually, the braking system comprises a plurality of service brakes, by means of which respective wheels of the utility vehicle and hence the utility vehicle as a whole can be braked. In the case of a pneumatic braking system, the respective service brake is a pneumatic service brake or a pneumatically operated service brake and can thus be actuated by means of a fluid, for example, compressed air. In the case of a hydraulic power braking system, the respective service brake can be actuated by means of a fluid, for example, a liquid, i.e., a hydraulic fluid.

The braking system can comprise a plurality of brake circuits and consequently can be implemented as a multi-circuit braking system. By means of the electronic brake system, it is possible to electronically distribute a braking demand that can be defined by the driver of the utility vehicle to the service brakes and thus to the associated wheels of the utility vehicle, which is implemented as a heavy goods vehicle, for example.

The electronic brake system comprises a braking value encoder, which is also referred to as a pedal value encoder (PVE). The braking value encoder comprises at least one sensor for detecting positions of a brake pedal actuated by the driver of the utility vehicle. In other words, the driver can specify his braking demand by actuating the brake pedal. For this purpose, the driver can move the brake pedal with his foot into different positions, wherein the positions are detected by means of the sensor of the braking value encoder. Usually, in the case of the pneumatic braking system at least one pump for each brake circuit charges at least one pneumatic pressure reservoir to a constant pneumatic pressure, wherein the pneumatic pressure is 12 bar, for example. From the respective pressure reservoirs, supply lines lead to respective valves, by means of which the wheels or the associated service brakes are subjected to pressure, i.e., can be supplied with compressed air from the pressure reservoirs.

If the driver operates the brake pedal, then the driver moves the brake pedal, for example, by a desired travel from a rest position into an actuation position. The travel is measured by means of the sensor, wherein the sensor provides a signal characterizing the measured travel, for example. Usually, the electronic brake system comprises at least one electronic control unit that receives the signal. The travel measured by means of the sensor is thus analyzed by the electronic control unit. As a result, the electronic control unit distributes the braking demand of the driver electronically to all wheels. For this purpose, the electronic control unit transmits an electronic pressure demand to the respective valve, which is thus implemented as an electrical valve or an electrically operated valve. The respective valve is connected to the electronic control unit and can be actuated, i.e., can be operated, by means of the electronic control unit. The respective valve then controls a respective wheel brake pressure by means of a dedicated pressure sensor. For this purpose, in the case of the pneumatic braking system the respective valve receives compressed air from the respective supply line to build up pressure. The previous and following implementations can also be transferred to a hydraulic external power system, in which case a liquid is used instead of compressed air.

By means of the respective brake circuits, one or a plurality of front axles, one or a plurality of rear axles and a trailer of the utility vehicle, for example, can be supplied with the medium, i.e., with compressed air, for example, for actuating respective service brakes.

The previously described electronic distribution of the braking demand to the wheels or the associated service brakes is a so-called electrical level of the electronic brake system. The electronic brake system usually also comprises a fallback level, in particular a pneumatic fallback level. To implement the fallback level, the braking value encoder comprises at least one valve that is different from the previously mentioned valves, which can be mechanically actuated by means of the brake pedal. The valve mechanically actuated by means of the brake pedal can be moved as a result of the mechanical actuation from a pressure reduction position into a pressure maintenance position and a pressure build-up position. In the pressure build-up position, the valve passes at least one fluid flow, for example, a compressed air flow for actuating at least one of the service brakes of the braking system. In other words, when the brake pedal is operated, the mechanically actuated valve, which is also referred to as a mechanical valve, in the braking value encoder that is actuated by the brake pedal is displaced into a different switch position. In the pressure build-up position, the valve fluid, for example, compressed air, can flow from a pressure reservoir into at least one control line. In this case it can be provided that the mechanical valve passes flows of compressed air into the control lines of the plurality of brake circuits. The control lines lead to respective wheel valves of the service brakes, so that the service brakes or associated wheels can be directly braked as a fallback level. This is, for example, beneficial if the electrical level, i.e., for example, the electronic control unit, fails, so that the previously mentioned electronic distribution of the braking demand to the wheels cannot be carried out.

Such an electronic brake system is known from EP 1 000 830 A2, for example.

Moreover, the electronic brake system can comprise at least one parking brake. Usually, a parking brake is not associated with each wheel, but only some of the wheels are fitted with a parking brake. Such a parking brake comprises at least one spring, for example, by means of which a brake lining can be permanently pressed against a corresponding brake element, for example, as a brake disk or a brake drum, whereby the utility vehicle can be held at rest. In other words, it is possible by means of the parking brake to secure the utility vehicle against unwanted rolling away, in particular if it is parked on a gradient. To release the parking brake, compressed air is used, which presses against the spring, for example, whereby the spring preload of the brake lining caused by means of the spring is overcome. This means that the parking brake is released by means of compressed air. The compressed air for actuating the parking brake comes from a further pressure reservoir.

If the electronic brake system or the braking system is completely intact overall, then each brake action is carried out at the electrical level that represents a first operating level. However, the following faults are conceivable:

In the case of a fault in the electronic brake system, the system switches itself off and the braking system automatically falls into the, in particular pneumatic, fallback level.

In the case of a leak in a brake circuit, for example, at least one of the other brake circuits is available to at least still ensure an auxiliary braking effect, which is required according to ECE R13, for example. Usually, three or four pressure reservoirs are provided.

If the pump should fail, according to the requirements of ECE R13 there is still compressed air available in the three or four pressure reservoirs to carry out at least eight full brake actions.

Disclosed embodiments provide an electronic brake system of the aforementioned type in a particularly simple way and in particular to arrange it for the implementation of an automatically driving utility vehicle in a particularly simple way, such that a particularly high braking effect can always still be achieved even in the event of a fault, in particular of an arbitrary single fault. The braking effect should come out to be significantly greater than is required for the auxiliary braking effect; the deceleration requirements on the service braking effect, i.e., the deceleration requirements on an intact braking system, may be met despite the presence of an arbitrary single fault.

The disclosed embodiments provide an electronic brake system for a braking system, in particular a pneumatic braking system or a hydraulic power braking system, of a utility vehicle. The electronic brake system comprises a braking value encoder, which comprises at least one sensor and at least one valve. By means of the sensor, positions of a brake pedal operated by the driver of the utility vehicle can be detected. The valve is a mechanically actuated valve or a mechanical valve, which can be mechanically actuated by means of the brake pedal. For each of the brake circuits of the utility vehicle, a dedicated valve is installed that can also be mechanically actuated. The mechanically actuated valve can be moved as a result of the mechanical actuation into different positions. There are thus three operating settings or positions of the respective mechanically actuated valve:

1. In a pressure build-up position, the valve passes a fluid flow, in particular a compressed air flow, from a pressure reservoir to service brakes or wheel brakes of the braking system. In the pressure build-up position, the deceleration of the utility vehicle increases.
2. In a pressure maintaining position, the compressed air flow from the pressure reservoir to the wheel brakes or from the wheel brakes to the surrounding air is inhibited by means of the mechanically actuated valve. In the pressure maintaining position, the utility vehicle is braked with constant deceleration.
3. In a pressure reduction position, the air flows out of the wheel brakes in the reverse direction through the mechanically actuated valve into the surrounding air. The deceleration of the utility vehicle reduces.

For the pressure build-up position and the pressure reduction position, a continuously adjustable deceleration of the utility vehicle is effected by opening up a greater or lesser flow cross-section in the mechanically actuated valve.

When the brake pedal is not actuated, the mechanically actuated valve is basically in the pressure reduction position. A residual pressure remaining in one of the brake circuits can thus flow out to the surrounding air.

To develop the electronic brake system in a particularly simple manner, and in particular to arrange the system in a particularly simple manner for the implementation of an automatically driving utility vehicle, such that even in the event of a fault, in particular of an arbitrary single fault, a particularly high braking effect can always still be achieved by means of the electronic brake system, it is provided according to the disclosed embodiments that at least one final control element that is different from the brake pedal is associated with the valve, by means of which the valve can be moved, i.e., in particular from the pressure reduction position into the pressure maintenance position and pressure build-up position.

If the electronic distribution of a braking demand specified by the driver to service brakes of the braking system that can be effected by the electronic brake system cannot be carried out, for example, because of a fault, then it is always still possible to move the valve by means of the final control element into the pressure build-up or pressure maintaining position, and as a result to actuate the at least one service brake of the braking system to achieve sufficient braking of the utility vehicle, even in the event of the failure of the previously described electronic level. As a result, it is still possible to achieve at least the so-called service braking effect according to ECE R13, thereby for the utility vehicle to achieve minimum braking or minimum deceleration of 5 meters per second squared, for example.

At the same time, the cost for the implementation of the high braking effect can be kept particularly low, because the electronic brake system or the braking value encoder does not have to be completely redesigned, but according to the disclosed embodiments it is provided to fit the already present mechanically actuated valve with the final control element, so that the valve can be actuated mechanically not only by the driver by means of the brake pedal, but also by means of the final control element.

As a result, it is possible, for example, within the context of the automatic driving of the utility vehicle to actuate the mechanically actuated valve, which is disposed in the braking value encoder, for example, by means of the final control element as if the driver mechanically actuated the valve by means of the brake pedal.

The mechanically actuated valve can thus not only be actuated, i.e., can be operated or moved, by means of the brake pedal, but also "from the outside", i.e., by means of a control unit, for example. As a result, for example, even in the case of the implementation of automatic driving of the utility vehicle the previously mentioned, already present, in particular pneumatic, fallback level can be implemented in a simple manner, so that an adequate braking effect can also be achieved during automatic driving in the event of a fault without excessive changes to the braking value encoder being necessary or being provided for this purpose.

In other words, redundancy regarding the actuation of the mechanically actuated valve can be provided with only low additional cost, because the mechanically actuated valve can be actuated, i.e., moved, not only by means of the brake pedal, but also by means of the final control element.

If the braking system is implemented as a pneumatic braking system, then the medium is compressed air, so that the respective service brake or wheel brake can be actuated pneumatically. The fluid flow is then a compressed air flow. If, however, the braking system is implemented as a hydraulic power braking system, then the medium is a liquid or a hydraulic fluid or a brake fluid, so that the respective service brake or wheel brake is actuated hydraulically. The fluid flow is then a liquid flow or a hydraulic flow.

To keep the cost for the implementation of the redundancy low, in the case of at least one disclosed embodiment it is provided that the final control element is implemented as an electrically operated final control element. This means that the final control element can be actuated using electrical current or electrical energy, so that finally the valve can be actuated not only mechanically, but also electrically.

It has been shown to be further particularly beneficial if the final control element is implemented as an electromagnet. Such an electromagnet can be integrated in a particularly simple and space-saving manner within the braking value encoder, which is also referred to as the pedal value encoder (PVE). As a result, excessive changes to the valve that is already present can also be avoided.

A further disclosed embodiment is characterized in that the valve can be moved by means of the final control element independently of the brake pedal. This means that the valve can be moved by means of the final control element without moving the brake pedal at the same time when doing so. In other words, the brake pedal can remain in the current position thereof, whilst the valve is moved relative to the pedal by means of the final control element. As a result, unwanted adverse effects of the brake pedal can be avoided, and a definite distinction can be drawn between braking initiated by the driver by means of operation of the brake pedal and externally initiated braking without actuation of the brake pedal. In this way, it can be detected whether the driver wants to take over the control of the vehicle again himself during automatic driving.

To achieve an adequate braking effect in a simple manner, even in the event of a fault, in the case of a further disclosed embodiment it is provided that the electronic brake system comprises a first battery for storing electrical current and a first electronic control unit connected to the first battery, which can be supplied with electrical current by the first battery. Furthermore, at least one electrically actuated second valve is provided and is actuated by means of the first electronic control unit depending on the respective detected position of the brake pedal, by means of which a fluid flow, in particular a compressed air flow, for actuating at least one service brake of the braking system can be adjusted. The at least one service brake can be the previously mentioned service brake or another service brake of the utility vehicle.

The previously mentioned electronic distribution of the braking demand to the respective service brakes and hence the wheels of the utility vehicle can thus be carried out by means of the first electronic control unit. If, for example, the first electronic control unit fails, so that the second valve can no longer be actuated by the first electronic control unit, i.e., cannot be operated, then the electronic distribution of the braking demand can no longer be carried out. In other words, the service brake can no longer be actuated by means of the second valve and the first electronic control unit. It is then possible, however, in particular during automatic driving of the utility vehicle, to actuate the first valve by means of the final control element and in doing so to move the valve from the pressure reduction position into the pressure maintenance position or pressure build-up position, thereby to actuate the service brake by means of the first valve and to cause adequate braking of the motor vehicle.

For the implementation of particularly beneficial redundancy in a simple manner, a second battery that is different from the first battery is provided for storing electrical current. Furthermore, the electronic brake system comprises a second electronic control unit that is different from the first electronic control unit, by means of which the final control element can be actuated. In this case, the second electronic control unit is connected to the second battery and can be supplied with electrical current by the second battery. By this means, redundancy is provided in respect of the energy supply to the electronic control units. If, for example, the first battery fails, so that the first electronic control unit can no longer be supplied with electrical current from the first battery, then the first electronic control unit also fails. As a result, the second valve can no longer be actuated by means of the second valve.

In this case however, the second electronic control unit can be supplied with electrical current from the second battery, so that the final control element can continue to be actuated by means of the second control unit. It is thus possible to actuate the final control element by means of the second electronic control unit, which is still available, and to actuate the first valve by means the final control element, so that the service brake can be actuated by means of the first valve.

In this case, it has further been shown to be particularly beneficial if the final control element is connected to the second battery and supplied with electrical current by the second battery. If the final control element is implemented as an electrical final control element or an electrically operated final control element, for example, then the final control element can be supplied with electrical current from the second battery in the event of the failure of the first battery and thereby in the event of the failure of the first electronic control unit, so that the final control element and thereby the first valve are available to actuate the service brake in the event of the failure of the electrical level of the electronic brake system.

In the case of a further disclosed embodiment, the sensor of the braking value encoder is connected to the first battery and can be supplied with electrical current by the first battery.

In this case, it has been shown to be beneficial if the braking value encoder comprises at least one second sensor for detecting the positions of the brake pedal, wherein the second sensor is connected to the second battery and can be supplied with electrical current by the second battery. By this means, on the one hand redundancy regarding the detection of the positions of the brake pedal is provided in a particularly simple manner. On the other hand, redundancy regarding the energy supply of the sensors is provided in a simple manner.

If, for example, the first battery fails, then the first sensor also fails. However, the second battery is still available to supply the second sensor with electrical current. Thus, the positions of the brake pedal can still be detected by means of the second sensor. As a result, it is in particular possible during automatic driving to definitely distinguish whether and to what extent the driver wishes to brake, i.e., to operate the brake pedal, despite automatic driving being performed. To implement this in a simple manner, the sensors are supplied from different electrical sources, such as the batteries.

In the case of a further disclosed embodiment, the first sensor is implemented to provide a first signal characterizing the respective detected positions and is coupled to the first electronic control unit. In this case, the first electronic control unit is implemented for detecting the first signal. In other words, the first signal is transmitted to the first electronic control unit and received by same, so that the first signal can be analyzed by means of the first electronic control unit.

In this case, the second sensor is implemented to provide a second signal characterizing the respective detected positions and is coupled to the second electronic control unit. In this case, the second electronic control unit is implemented for detecting the second signal. In other words, the second signal is transmitted from the second sensor to the second electronic control unit and is detected by the second electronic control unit, so that the second signal can be analyzed by means of the second electronic control unit. By this means, not only is redundancy of the sensors provided regarding the energy supply thereof, but redundancy regarding the analysis of the signals is also provided, because the first signal can be analyzed by means of the first electronic control unit and the second signal can be analyzed by means of the second electronic control unit.

In this case, it can be provided that the electronic control units, which are also referred to as ECUs (ECU—Electronic Control Unit), are electrically coupled to each other by means of a data bus system, such as, for example, a CAN bus, so that the electronic control units can exchange the signals via the data bus system. As a result, it is possible to mutually plausibility check the signals to be able to detect any faults.

In a further disclosed embodiment, the electronic brake system comprises at least one, in particular pneumatically operated, parking brake and at least one third valve. At this point it should be noted that the second valve is a second valve that is different from the first valve and that is provided in addition thereto, wherein the third valve is a third valve that is different from the first valve and from the second valve and is provided in addition thereto. By means of the third valve, a fluid flow, in particular a compressed air flow, for actuating the parking brake can be adjusted. In this case, at least one second final control element, in particular an electrically operated second final control element such as, for example, a second electromagnet, by means of which the third valve can be actuated, is associated with the third valve. As a result, it is also possible to incorporate the parking brake within automatic driving in a particularly simple manner, because the parking brake is fitted with the second final control element in a simple manner. As a result, excessive changes to the parking brake can be avoided.

Usually, the parking brake is applied and released by the driver by operating a hand lever. By operating the hand lever, a pressure, in particular a pneumatic pressure, can be adjusted in a parking brake line. By means of the third valve and of the second final control element associated with the third valve for actuating the third valve, it is possible to suitably influence and graduate the pressure in the parking brake line independently of the operation of the hand lever by the driver, so that the parking brake and a parking brake circuit associated therewith, in which the parking brake is disposed, can be used as a fallback level, for example, in the event of a leak in a service brake circuit of the associated axle. For this purpose, the third valve, which is also referred to as the parking brake valve, can be actuated or operated by means of the second final control element.

In this case, it has been shown to be particularly beneficial if the third valve (parking brake valve) can be actuated by means of the first electronic control unit. In other words, it may be provided that the actuation of the second final control element is carried out by the first electronic control unit, because a leak and a simultaneous fault in the first electronic control unit can be excluded. At the same time, as a result the parking brake can be configured as an automatic parking brake, which is very useful for the implementation of automatic driving and for the implementation of driverless maneuvering at a depot.

The disclosed embodiments also include a utility vehicle with an electronic brake system. The utility vehicle is, for example, a heavy goods vehicle, wherein by means of the electronic brake system automatic driving of the utility vehicle can be embodied in a particularly simple manner. It is possible hereby to incorporate the mechanically actuated valve into automatic driving and hereby also to be able to implement the previously described fallback level during automatic driving in a particularly simple manner. As a result, the costs of implementation of automatic driving can be kept particularly low.

The features and combinations of features mentioned above in the description and the features and combinations of features mentioned in the description of the figures and/or shown in the figures alone are not only able to be used in the respective specified combination, but also in other combinations or on their own, without departing from the scope of the disclosure.

FIG. 1 shows in a schematic representation an electronic brake system that is denoted as a whole by 10 for a pneumatic braking system of a utility vehicle. The pneumatic braking system comprises a plurality of pneumatically actuated service brakes, each of which is associated with at least one wheel of the utility vehicle. In this case, the respective wheel can be braked by means of the respective associated service brake, so that the utility vehicle as a whole a can be braked. The service brakes are also referred to as wheel brakes.

The electronic brake system 10 is implemented as a multi-circuit brake system and comprises a first brake circuit that is denoted in FIG. 1 by 12, by means of which service brakes of a rear axle 14 of the utility vehicle can be supplied with compressed air for actuating the service brakes, which are also referred to as wheel brakes. A wheel brake 41 associated with the left rear wheel of the utility vehicle for braking the left rear wheel and a wheel brake 43 associated with a right rear wheel of the utility vehicle for braking the right rear wheel are disposed in the first brake circuit 12, being supplied with compressed air by the first brake circuit 12 for actuating the respective wheel brakes 41 and 43. Furthermore, a valve device 35 is disposed in the first brake circuit 12 that comprises a rear axle modulator, an ABS valve associated with the wheel brake 41 and an ABS valve (ABS—Anti-lock Brake System) associated with the wheel brake 43.

Using the service brakes of the rear axle 14, the rear wheels of the utility vehicle can be braked. Furthermore, a trailer control valve 16 can be actuated with compressed air by means of the first brake circuit 12.

Furthermore, the electronic brake system 10 or the pneumatic braking system comprises a second brake circuit 18, by means of which service brakes of a front axle 20 of the utility vehicle can be supplied with compressed air. The front wheels of the utility vehicle can be braked by means of the service brakes of the front axle 20. A valve device 37 that is implemented as a proportional relay valve, for example, is disposed in the second brake circuit 18. Furthermore, valves 70 and 72, in particular, ABS valves, are disposed in the second brake circuit, wherein a wheel brake 71 is associated with the valve 70 that is associated with a left front wheel of the utility vehicle and that is used for braking the left front wheel. A wheel brake 73 is associated with the valve 72 that is associated with a right front wheel of the utility vehicle and that is used for braking the right front wheel. The wheel brakes 71 and 73 can be supplied with compressed air for actuating the wheel brakes 71 and 73 via the valves 70 and 72 and the valve device 37.

If the utility vehicle comprises a device for towing a trailer, then the electronic brake system 10 additionally comprises a third brake circuit 19 with a pressure reservoir V3, by means of wheel brakes 21 of the trailer can be supplied with compressed air. The control of the compressed air from the reservoir V3 to the wheel brakes 21 is carried out by means of the compressed air from the first brake circuit 12. This modulates the compressed air from the reservoir V3 in the trailer control valve 16 for the wheel brakes 21 of the trailer, which are also referred to as service brakes.

The first brake circuit 12 comprises at least one first pressure reservoir V1 for storing compressed air. The service brakes of the rear axle 14 and the trailer control valve 16 can thus be supplied with compressed air from the first pressure reservoir V1. The pressure reservoir V1 is thus a first tank for storing compressed air. Similarly, the second brake circuit 18 comprises at least one second pressure reservoir V2 for storing compressed air, so that the service brakes of the front axle 20 can be supplied with compressed air from the pressure reservoir V2. If the utility vehicle comprises a device for towing a trailer, then the third brake circuit comprises the third reservoir V3 for storing compressed air, so that the service brakes of the trailer can be supplied with compressed air from the reservoir V3.

The electronic brake system 10 and hence the pneumatic braking system further comprise a pump 22 for transporting compressed air that is common to the brake circuits 12 and 18 and hence to the pressure reservoirs V1, V2 and V3. By means of the pump 22, the pressure reservoirs V1, V2 and V3 can be filled with compressed air. In other words, by means of the pump 22, compressed air is transported and as a result supplied to the pressure reservoirs V1, V2 and V3, in which the compressed air can be stored at pressure. For example, the compressed air is stored in the pressure reservoirs V1, V2 and V3 at 12 bar. The pump 22 may be implemented as a compressing device, which is also referred to as a compressor or air compressor. By means of the compressor, the compressed air can be compressed and stored at high pressure in the pressure reservoirs V1, V2 and V3.

Moreover, the electronic brake system 10 comprises a braking value encoder that is referred to as a whole by 24 and that is also referred to as a pedal value encoder (PVE). Furthermore, the electronic brake system 10 comprises an actuating element, for example, a brake pedal 26, which can be operated by the driver and moved as a result. The driver can operate the brake pedal 26 with his foot and specify a braking demand as a result.

In the present case, the brake pedal 26 can be pivoted about a pivot axis 28, as indicated in FIG. 1 by a double arrow 31. In this case, the brake pedal 26 can be moved between two end positions and can be moved by the driver into the end positions and a number of different intermediate positions between the end positions. The intermediate positions and one of the end positions correspond to a respective braking demand of the driver. The further or harder the driver moves the brake pedal 26 from the first end position thereof shown in FIG. 1 towards the second end position, the greater is a braking effect or deceleration that is wanted by the driver.

To move the brake pedal 26 back from the second end position thereof to the first end position thereof, a spring element 30 is provided that is tensioned by moving the brake pedal 26 from the first end position towards the second end position. If the driver terminates the operation of the brake pedal 26, then the spring element 30 can expand, whereby the brake pedal 26 is moved back into the first end position. In the first end position, the braking demand is 0. In other words, when the brake pedal 26 is in the first end position thereof, there is no deceleration of the utility vehicle that is caused by the electronic brake system 10.

The braking value encoder 24 comprises at least one sensor 32 that is in particular schematically represented in FIG. 1, by means of which the respective positions of the brake pedal 26 can be detected. Because the brake pedal 26 can be pivoted about the pivot axis 28 in the present case, the sensor 32 is, for example, implemented as an angle sensor or angle encoder, so that respective angular positions of the brake pedal 26 in relation to the pivot axis 28 can be detected by means of the sensor 32. In other words, the sensor 32 is implemented to detect a respective travel by which the brake pedal 26 is moved by the driver.

The sensor 32 is implemented as an electrical sensor and provides a signal characterizing the detected positions of the brake pedal 26 that is transmitted to a first electronic control unit EBS and is received by the first electronic control unit EBS. As a result, the signal can be analyzed by means of the first electronic control unit EBS. The sensor can also be duplicated to remain compatible with an EBS for a non-automatically driving utility vehicle. Moreover, it can be seen from FIG. 1 that the braking value encoder 24 comprises two valves 34 and 36 mechanically actuated by means of the brake pedal 26, wherein the valve 34 is associated with the brake circuit 12 and the valve 36 is associated with the brake circuit 18.

It can be seen from FIG. 1 that the valves 34 and 36 are mechanically coupled to the brake pedal 26 by means of a mechanical coupling device 39, so that the valves 34 and 36 can be mechanically operated, i.e., can be moved, by the driver by means of the brake pedal 26. If the driver moves the brake pedal 26 from the first end position thereof towards a second end position, then the valves 34 and 36 are also actuated. As a result of the actuation, the valves 34 and 36 are moved from a respective pressure reduction position shown in FIG. 1 into a pressure maintenance position or pressure build-up position, in which the valves 34 and 36 pass at least one respective compressed air flow for actuating at least one service brake of the rear axle 14 or front axle 20.

As a result of the movement of the valves 34 and 36, the following operating states are possible:

1. In a pressure reduction position represented in FIG. 1, compressed air can flow out from the wheel brakes of the rear axle 14 and of the trailer via the valve 36 and through a noise damper 40 to the surroundings. Compressed air also flows out of the wheel brakes of the front axle 20 via the valve 34 and a noise damper 38 to the surrounding air.
2. In a respective pressure maintaining position of the valves 34 and 36, the wheel brakes are isolated from the pressure reservoirs V1 and V2 and the noise dampers 38 and 40. In the pressure maintaining position, the pressure in the wheel brakes is maintained, therefore the valve position is referred to as a pressure maintaining position.
3. In a third switch position, a pressure build-up position of the valves 34 and 36, the pressure reservoirs V1 and V2 are connected to the wheel brakes by means of the valves 34 and 36, so that compressed air can flow from the reservoirs V1 and V2 through the valves 34 and 36 to the wheel brakes.

Between the valves 34 and 36 and the wheel brakes of the rear axle 14, the front axle 20 and the trailer, and there are valves 70 and 72 by means of which the electronic brake system 10, in particular by means of the first electronic control unit EBS, electronically distributes the braking demand specified by the driver to the respective service brakes and hence to the wheels of the utility vehicle. For this purpose, for example, the first electronic control unit EBS transmits an electronic pressure demand to the valves 70 and 72 that regulates a respective brake pressure at the respective service brake by means of a respective dedicated pressure sensor.

In the case of a fully intact pneumatic braking system, every braking action is carried out at the electrical level of the electronic brake system 10. If, however, the first electronic control unit EBS fails, for example, then the valves 70 and 72 can no longer be actuated by the first electronic control unit EBS, i.e., can no longer be operated by the first electronic control unit EBS. The electronic brake system 10 then automatically falls back to the pneumatic fallback level, so that the service brakes of the rear axle 14 and the front axle 20 are supplied with compressed air via the mechanically actuated valves 34 and 36. As a result, an adequate braking effect can be guaranteed even in the event of a fault.

It can further be seen from FIG. 1 that the electronic brake system 10 comprises a first battery 42 for storing electrical current. The battery 42 may be a conventional battery of the utility vehicle, which has a voltage of 24 volts, for example. In the present case, the first electronic control unit EBS is connected to the battery 42 and can thus be supplied with electrical current by the battery 42. The valves 70 and 72 are also connected to the battery 42 and as a result can be supplied with electrical current by the battery 42. The valves 70 and 72 are implemented as solenoid valves, for example, and each comprises an electrical final control element for this purpose, for example, an electromagnet, by means of which respective valve bodies of the valves 70 and 72 can be moved using electrical current from the battery 42.

To be able to guarantee a particularly high braking effect and to be able to arrange the electronic brake system 10 in a particularly simple, inexpensive and weight-optimal manner for the implementation of automatic driving of the utility vehicle by means of the electronic brake system 10, even in the event of a fault, in a particularly simple manner, a common final control element 44 that is different from the brake pedal 26 and that is provided in addition to the brake pedal 26 is associated with the valves 34 and 36 and is implemented as an electrically operated final control element, such as an electromagnet. By means of the electromagnet, the valves 34 and 36 can be moved from the respective pressure reduction position into the respective pressure maintenance position or pressure build-up position independently of the brake pedal 26, i.e., without moving the brake pedal 26 or influencing the respective position of the brake pedal 26.

By means of the final control element 44, it is thus possible to move the valves 34 and 36 during automatic driving of the utility vehicle without the driver operating the brake pedal 26. As a result, it is possible to implement the pneumatic fallback level in a simple manner without action by the driver and thus also during automatic driving, so that, for example, an adequate braking effect can be achieved even if the valves 70 or 72 fail. I.e., in this case the respective service brakes can be supplied with compressed air via the valves 34 and 36, because the valves 34 and 36 can be moved by means of the final control element 44 without action by the driver.

The valves 34 and 36 are, for example, disposed in a housing of the braking value encoder 24. In this case, the final control element 44 can also be integrated within the braking value encoder 24 in a particularly simple manner, in particular in the housing thereof, without excessive changes to the braking value encoder 24 being necessary for this purpose. As a result, the electronic brake system 10 can be arranged in a particularly simple, inexpensive manner and space-saving manner for the implementation of safe automatic driving.

Owing to the ability of the valves 34 and 36 to be actuated by means of the final control element 44, redundancy regarding the actuation of the respective service brakes can also be implemented during automatic driving, because in the normal mode, i.e., if the electronic brake system 10 is intact, the valves 70 and 72 can be actuated by means of the first electronic control unit EBS during automatic travel. As a result, the service brakes can be actuated during automatic driving by means of the first electronic control unit EBS via the valves 70 and 72. However, if at least one of the valves 70 or 72 fails, i.e., if at least one of the valves 70 or 72 cannot be actuated during automatic driving, and as a result cannot be operated, then the valves 34 and 36, which can be moved by means of the final control element 44, are always still available.

To also incorporate actuation of the final control element 44 into the redundancy, the electronic brake system 10 comprises a second electronic control unit ECU2 that is different from the first electronic control unit EBS and that is provided in addition to the first electronic control unit EBS. The second electronic control unit ECU2 is coupled, in particular electrically connected, to the final control element 44 so that the final control element 44 can be actuated, i.e., can be operated, by means of the second electronic control unit ECU2. Thus, if, for example, the first electronic control unit EBS fails, so that the valves 70 and 72 also fail because the valves 70 and 72 can no longer be actuated by means of the first electronic control unit EBS, then the second electronic control unit ECU2 is always still available to actuate the final control element 44 and by means of same to actuate the valves 34 and 36.

Moreover, to also incorporate the respective energy supply into the redundancy, the electronic brake system 10 comprises a second battery 46 for storing electric current that is different from the first battery 42 and that is provided in addition to the first battery 42. The second electronic control unit ECU2 is connected to the second battery 46 and can be supplied with electrical current from the second battery 46. The final control element 44 is also connected to the second battery 46 and can be supplied with electrical current from the second battery 46. If, for example, the first battery 42 now fails, so that the first electronic control unit EBS and the valves 70 and 72 can no longer be supplied with electrical current and thus cannot be operated, then the battery 46 is still available to supply the second electronic control unit ECU2 and the final control element 44 with electrical current, so that the valves 34 and 36 can be moved. For example, the second battery 46 has a voltage of 12 volts.

To be able to detect the respective position of the brake pedal 26 particularly precisely, the braking value encoder 24 comprises at least one switch, for example. The switch is, for example, implemented such that it is closed by actuating the brake pedal 26 if the brake pedal 26 is pivoted to the maximum extent up to the switching angle. The switching angle is, for example, 3 to 7 degrees. If, for example, it is determined using the signal that the brake pedal 26 has already pivoted by more than the switching angle but the switch has not closed, then a fault can be concluded. This means that it is possible to plausibility check the position detected by the sensor 32 or the signal provided by the sensor 32 using the switch. In this case, the switch is an electrical switch and is connected to the battery 42, for example, and is coupled with electrical current by the battery 42. Furthermore, the switch is coupled to the first electronic control unit EBS, so that if it is closed the switch can transmit a further signal characterizing the closing thereof to the first electronic control unit EBS, which receives the further signal. The first electronic control unit EBS can thus receive the first signal and the further signal and can check the signals against each other or plausibility check the signals.

A second sensor and switch can be installed, which are supplied with electrical current by the second battery 46 and which are analyzed in a second ECU2.

A third sensor and switch that are not represented in the figure can be installed to obtain compatibility with EBSs that are currently being manufactured in volume.

Figure 2:
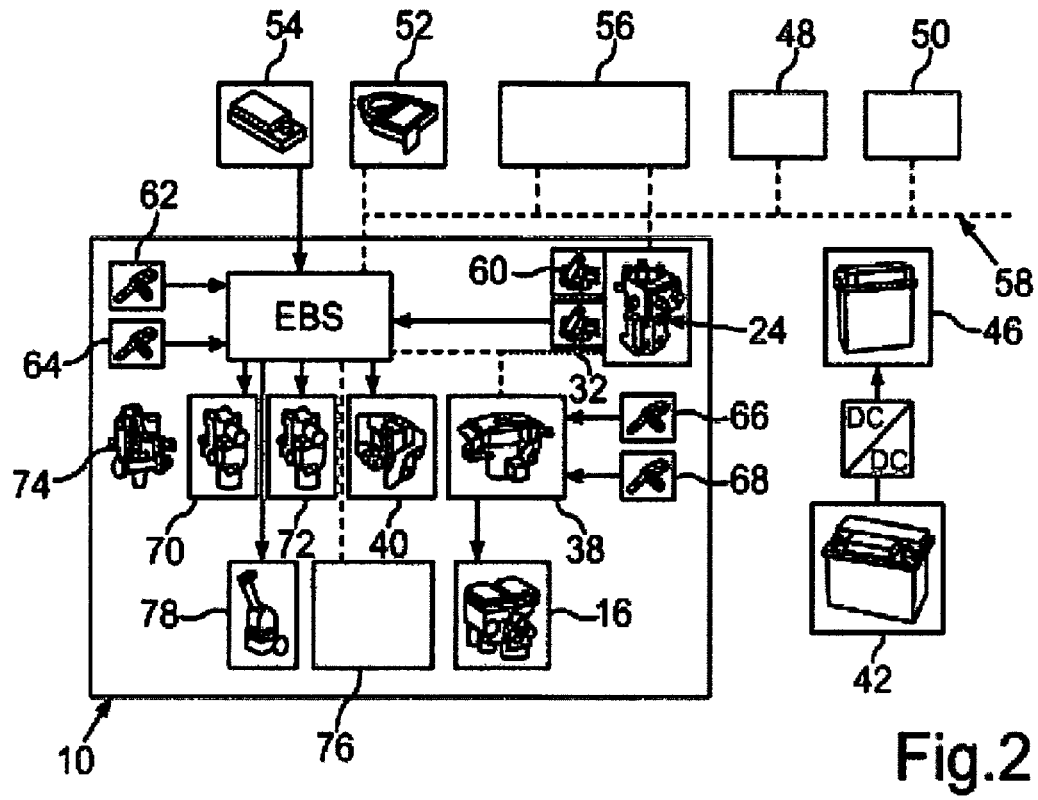
FIG. 2 shows a schematic representation of the electronic brake system according to a first disclosed embodiment.

FIG. 2 shows the electronic brake system 10 according to a first disclosed embodiment. In FIG. 2, a motor 48 can also be seen, by means of which the utility vehicle can be driven. For example, the motor 48 is a combustion engine. Furthermore, the motor 48 can be an electric motor or a combination of an electric motor and a combustion engine. Moreover, the utility vehicle comprises a retarder 50 and a steering angle sensor 52, by means of which positions of a manual steering control of the utility vehicle, in particular, a steering wheel, can be detected. Moreover, the utility vehicle comprises a sensor cluster 54, by means of which for example, parameters can be detected that characterize the driving dynamic driving state of the utility vehicle.

For the implementation of automatic driving, an electronic control unit 56 is provided. In the case of the second disclosed embodiment, the control unit 56 is a control unit that is different from and that is provided in addition to the first electronic control unit EBS and the second electronic control unit ECU2, so that in the case of the second embodiment, three mutually different electronic control units are provided in total. In the case of the first disclosed embodiment, the second electronic control unit ECU2, which cannot be seen in FIG. 2, is a control unit of the braking value encoder 24 and is integrated within the braking value encoder 24, for example. The braking value encoder 24 thus has dedicated local intelligence, in particular, the electronic control unit ECU2.

Figure 3:
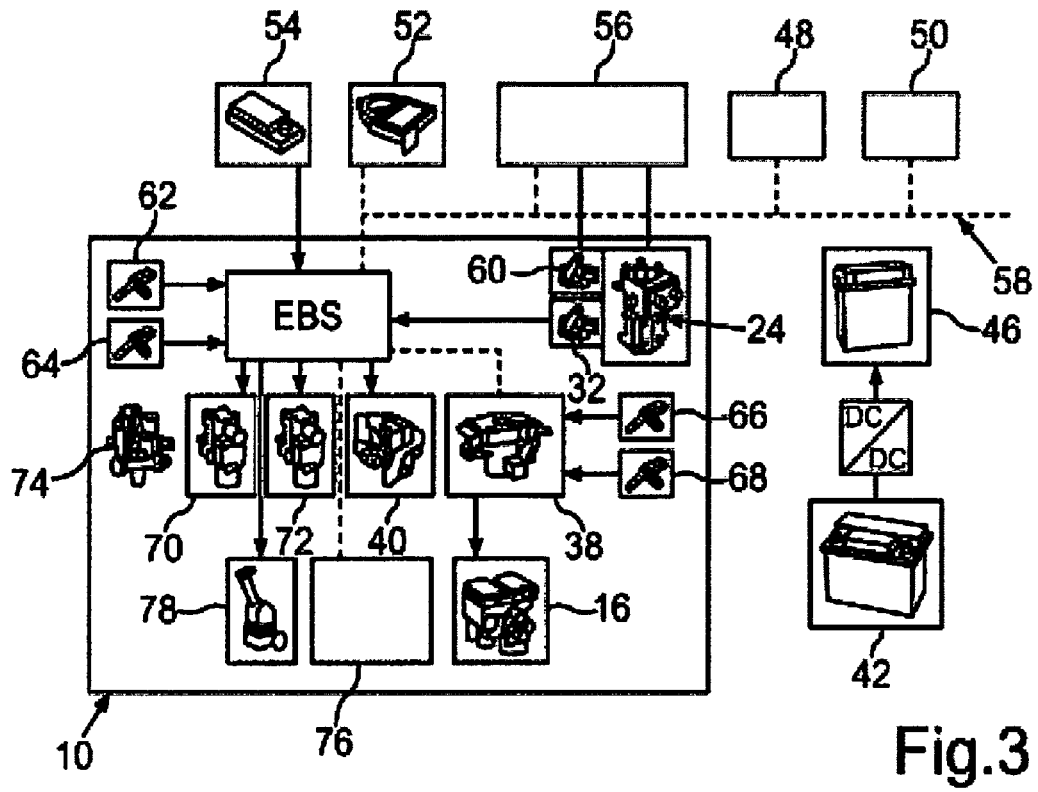
FIG. 3 shows a schematic representation of the electronic brake system according to a second disclosed embodiment.

FIG. 3 shows a second disclosed embodiment of the electronic brake system 10, in which the braking value encoder 24, in contrast to the first disclosed embodiment, has no dedicated electronic control unit. In the case of the second disclosed embodiment, the control unit 56 is thus the electronic control unit ECU2, which is used to carry out automatic driving and to actuate the final control element 44.

It can be seen from FIG. 2 that the steering angle sensor 52, the motor 48, the retarder 50, the electronic control unit 56 and the braking value encoder 24, in particular the additionally provided electronic control unit ECU2 in the case of the first disclosed embodiment, are connected to each other by means of a data bus system 58 and can exchange information or signals by means of the data bus system 58. During automatic driving, it is provided that the motor 48 and, for example, the manual steering control are actuated and thereby operated automatically by means of the electronic control unit 56, i.e., without action by the driver. Furthermore, the electronic control unit EBS is also actuated by means of the control unit 56, so that during automatic driving the utility vehicle is accelerated, braked and steered automatically.

Depending on a number of signals provided by sensors and received, the electronic control unit 56 makes braking demands to the electronic control unit EBS. In other words, during automatic driving it is provided that it is not only the driver that makes braking demands or creates braking intentions by operating the brake pedal 26, but the electronic control unit 56 also makes braking demands or creates braking intentions. For reasons of redundancy, the electronic control unit 56 and the sensors thereof are connected both to the battery 42 and also to the battery 46 and can be supplied with electrical current from the batteries 42 and 46.

The braking demands made by the electronic control unit 56 are transmitted redundantly to the electronic control unit EBS. Also in the case of the first disclosed embodiment, the final control element 44 can be supplied with electrical current from the battery 46, because the final control element 44 would be supplied with electrical energy from the battery 42, and thus in the event of a fault in the energy supply neither the electronic control unit EBS nor the valves 34 and 36 of the pneumatic fallback level would be able to carry out the braking demands of the electronic control unit 56. Therefore, the electromagnet (final control element 44) and the actuation thereof, particularly the electronic control unit ECU2 or 56, are supplied with electrical current from the battery 46.

It can be seen from FIGS. 2 and 3 that a second sensor 60 of the braking value encoder 24 that is different from the sensor 32 is provided for detecting the positions of the brake pedal 26. Furthermore, a second switch is provided, the function of which corresponds to the first switch. This means that the first sensor 32, the first switch, the second sensor 60 and the second switch detect the positions or the travel of the brake pedal 26. In the case of automatic driving, it is beneficial to be able to positively distinguish whether and how strongly the driver wants to brake despite automatic driving being carried out.

For this purpose, it is beneficial to incorporate the sensors 32 and 60 and the switch in the redundancy. The first sensor 32 is, for example, connected to the battery 42 and can be supplied with electrical current from the battery 42. Furthermore, the signal provided by the sensor 32 is transmitted to the electronic control unit EBS and is received and suitably analyzed by same. The second sensor 60 is, for example, also implemented as an electrical sensor, and in this case it is however connected to the battery 46 and can be supplied with electrical current by the battery 46. The sensor 60 also provides a signal that is detected by means of the sensor 60, that characterizes the detected positions of the brake pedal 26 and that is transmitted to the electronic control unit ECU2 and analyzed by same. The same applies to the first switch, which is connected to the battery 42 and the signal of which is transmitted to the electronic control unit EBS. The second switch is connected to the battery 46 and transmits the signal thereof to the electronic control unit ECU2.

In the case of the second disclosed embodiment, the electronic control unit ECU2 is not provided, wherein the electronic control unit 56 carries out the functions of the electronic control unit 56 that is provided in the case of the first disclosed embodiment and the functions of the electronic control unit ECU2. This means that in the case of the second disclosed embodiment the electronic control unit 56 analyzes the second sensor 60 and the second switch to detect the positions of the brake pedal 26. In this case, the second disclosed embodiment has the benefit that not three electronic control units as with the first disclosed embodiment, but only two electronic control units must be used. Likewise, a data connection between the ECU2 and the control unit 56 is not required.

Optionally, a third sensor and a third switch for detecting the respective positions of the brake pedal 26 can be provided, wherein the previous implementations can be readily transferred to the third switch and the third sensor, in particular regarding the function of the first sensor 32 and of the first switch or of the second sensor 60 and of the second switch. In this case, it may be provided that the third sensor and the third switch can be supplied with electrical current by the battery 42 and analyzed by the electronic control unit EBS.

The analysis shall mean that the third switch and the third sensor are connected to the electronic control unit EBS and consequently the respective signals thereof characterizing the positions of the brake pedal 26 are transmitted to the electronic control unit EBS, which receives the signals. By this means, it is possible to arrange the electronic brake system 10 for automatic driving in a particularly simple manner without having to change conventional electronic brake systems. As a result, a diversification in the hardware can be omitted, which may possibly result in cost benefit against the background of usually small quantities of utility vehicles. The difference between automatic and non-automatic driving of utility vehicles would then lie, for example, in different brake pedal modules with different part numbers during assembly.

It can further be seen from FIG. 2 that the electronic brake system 10 comprises a revolution rate sensor 62 for detecting a revolution rate of the left front wheel. Furthermore, the electronic brake system 10 comprises a revolution rate sensor 64 for detecting a revolution rate of the right front wheel. The revolution rate sensors 62 and 64 provide respective signals characterizing the respective revolution rates, which are transmitted to the electronic control unit EBS and are received by same. A revolution rate sensor 66 for detecting a revolution rate of the left rear wheel and a revolution rate sensor 68 for detecting a revolution rate of the right rear wheel are provided. The revolution rate sensors 66 and 68 provide respective signals characterizing the respective revolution rates, which are transmitted to the valve device 35 and are received by the valve device 35.

Moreover, the valves 70 and 72 implemented as ABS valves can be seen in FIG. 2, wherein the valve 70 is associated with the left front wheel and the valve 72 is associated with the right front wheel. Moreover, the electronic brake system 10 can comprise a reducing valve 74. If a trailer is provided, then the trailer comprises an electronic control unit 76, which is also referred to as a trailer EBS and is, for example, coupled to the electronic control unit EBS.

Figure 4:
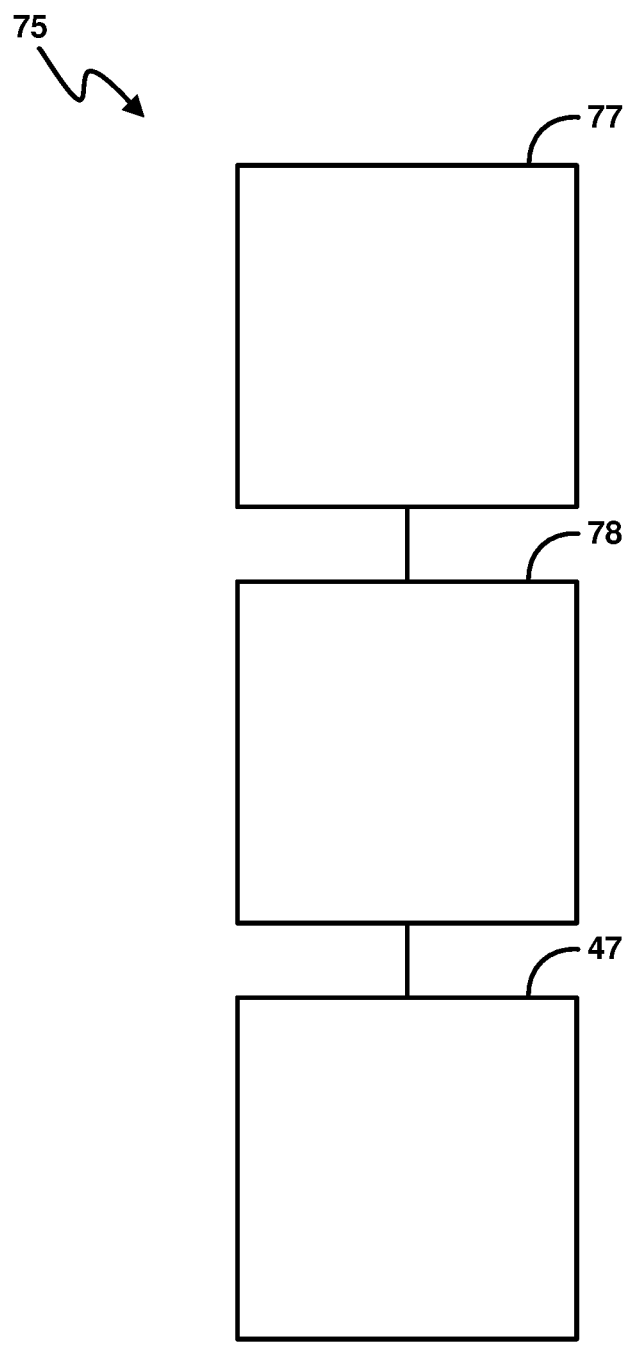
FIG. 4 shows a schematic representation of a parking brake in accordance with the present disclosure.

Furthermore, the electronic brake system 10 can comprise a parking brake 75 with a valve, such as a parking brake valve 78, as shown for example in FIG. 4. The parking brake 75 can, for example, be engaged and disengaged by the driver by operating a hand lever 77. For example, the parking brake comprises a brake lining and a spring, by means of which the brake lining is constantly held, in particular pressed, against a corresponding brake element, in particular, a brake disk or a brake drum. As a result, a wheel associated with the parking brake, which is rotationally fixedly connected to the brake element, can be secured against unwanted rotation by means of the brake lining, so that, for example, the utility vehicle that is parked on a gradient can be secured against unwanted rolling away. For disengaging or releasing the parking brake, compressed air is used that, for example, comes from a further pressure reservoir that is different from the pressure reservoirs V1 and V2. By means of the compressed air, the brake lining is moved against the spring away from the corresponding brake element, so that the brake lining no longer interacts with the corresponding brake element. This means that the parking brake is released by means of compressed air.

In this case, it is now possible to also incorporate the parking brake into the automatic process. The parking brake is associated with a parking brake line, for example, by means of which the compressed air for moving the brake lining is delivered. In this case, the compressed air in the parking brake line has a pneumatic pressure. If the pneumatic pressure in the parking brake line is suitably influenced and is made staged, for example, then, for example, a parking brake circuit in which the parking brake is disposed can be used as a fallback level for the case of a leak in the brake circuits 12 and 18 that are implemented as service brake circuits.

For this purpose, the parking brake valve 78 is implemented as an electrical parking brake valve or an electrically operated or electrically actuated parking brake valve. This means that the parking brake valve 78 is fitted with a second final control element 47, in particular an electrical final control element, so that the parking brake valve 78 can be actuated automatically, i.e., without action by the driver, as shown for example in FIG. 4. The parking brake valve 78 or the second final control element 47 may be connected to the battery 42 and can be supplied with electrical current by the second battery 42. Furthermore, it may be provided that the second final control element is coupled to the electronic control unit EBS and as a result can be actuated by means of the electronic control unit EBS. This means that the parking brake valve 78 can be actuated by the electronic control unit EBS by means of the second final control element 47, so that the parking brake 75 can be incorporated into automatic driving.

To move the valves 34 and 36 independently of the brake pedal 26, the coupling device 39 is constructed telescopically. For this purpose, the coupling device 39 comprises a cylinder 80 that is connected to the brake pedal 26 and a rod 82 connected to the valves 34 and 36 that is partly accommodated in the cylinder 80 and can be moved translationally, i.e., displaced, relative to the cylinder 80. The rod 82 can be supported on the floor 84 of the cylinder 80, so that the floor 84 comes into supporting contact with the rod 82 if the driver operates the brake pedal 26 appropriately. As a result, the driver can actuate the valves 34 and 36 mechanically by means of the brake pedal 26, the floor 84 and the rod 82.

Furthermore, the coupling device 39 comprises a spring element 86 that is tensioned by moving the valves 34 and 36 to the open position. If a force application by means of which the valves 34 and 36 are moved to the open position and held against the spring element 86 is terminated, then the spring element 86 can expand, whereby the valves 34 and 36 are moved from the open position back to the closed position by means of the expanding spring element 86.

If the final control element 44 is now actuated, for example, so that the valves 34 and 36 are moved from the pressure reduction position to the pressure maintenance position or the pressure build-up position by means of the final control element 44, whereas the brake pedal 26 is disposed in the first end position and is not moved, then the rod 82 is at least partly moved out of the cylinder 80 and away from the floor 84 without thereby causing movement of the brake pedal 26, i.e. the brake pedal 26 is held in the first end position by means of the spring element 30. The movement of the valves 34 and 36 caused by the final control element 44 is carried out, for example, by energizing the final control element 44, i.e., by supplying the final control element 44 with electrical current. If the energization is terminated, then the previously mentioned force application is also terminated, so that the spring element 86 expands and the valves 34 and 36 can move to the closed position. As a result, the rod 82 is pushed back into the cylinder 80 again.

Overall, it can be seen that by the use of the final control element 44, the braking value encoder 24 and in particular the valves 34 and 36 can be actuated externally without having to change the braking value encoder 24 excessively. By means of the final control element 44 it is possible to actuate the valves 34 and 36 disposed in the braking value encoder 24 during each braking demand during the automatic process as if the driver actuated the valves 34 and 36 mechanically by means of the brake pedal 26. However, the valves 34 and 36 are actuated by means of the electromagnet and not mechanically by means of the brake pedal 26, for example. As a result, the electronic brake system 10 can be arranged in a particularly simple manner for the implementation of automatic driving.

The invention claimed is:

1. An electronic brake system for a braking system of a utility vehicle, the electronic brake system comprising:
   a braking value encoder that includes at least one sensor for detecting positions of a brake pedal that is operable by a driver of the utility vehicle and includes at least one first valve that is mechanically actuated by the brake pedal, wherein, as a result of the mechanical actuation, the at least one first valve is moved from a pressure reduction position to at least one pressure maintenance position or pressure build-up position, wherein, in each of the pressure maintenance position and pressure build up position, the at least one first valve passes at least one fluid flow from a pressure source through the at least one first valve to actuate at least one service brake of the braking system;
   at least one final control element associated with and controlling the at least one first valve, wherein the at least one final control element is different from the brake pedal, wherein, by operation of the at least one final control element, the at least one first valve is moved from the pressure reduction position to the at least one pressure maintenance position or pressure build-up position, wherein movement of the at least one first valve by the at least one final control element is independent of movement of the brake pedal;
   a first battery that stores and supplies electrical current;
   a first electronic control unit connected to the first battery and supplied with electrical current by the first battery;
   at least one electrically operated second valve actuated by the first electronic control unit depending on the position of the brake pedal detected by the at least one sensor, wherein actuation of the at least on electrically operated second valve adjusts the fluid flow for actuating the at least one service brake of the braking system;
   a second battery, which is different from the first battery, and stores and supplies electrical current; and
   at least one second electronic control unit, which is different from the first electronic control unit, and actuates the at least one final control element, wherein the second electronic control unit is connected to the second battery and is supplied with electrical current from the second battery,
   wherein the at least one first valve is coupled to the brake pedal by a coupling device, and wherein the coupling device is configured to allow movement of the at least one first valve relative to the brake pedal.

2. The electronic brake system of claim 1, wherein the at least one final control element is an electrically operated final control element.

3. The electronic brake system of claim 2, wherein the at least one final control element is an electromagnet.

4. The electronic brake system of claim 1, wherein the at least one final control element is connected to the second battery and is supplied with electrical current from the second battery.

5. The electronic brake system of claim 1, wherein the at least one sensor is connected to the first battery and is supplied with electrical current from the first battery.

6. The electronic brake system of claim 5, wherein the at least one sensor includes a first sensor and at least one second sensor for detecting the positions of the brake pedal, wherein the at least one second sensor is connected to the second battery and is supplied with electrical current from the second battery.

7. The electronic brake system of claim 6, wherein the first sensor is implemented to provide a first signal characterizing the respective detected positions and is coupled to the first electronic control unit, which detects the first signal, wherein the at least one second sensor provides a second signal characterizing the respective detected positions and is coupled to the at least one second electronic control unit, which is implemented for detecting the second signal.

8. The electronic brake system of claim 1, wherein a vehicle control unit for carrying out automatic driving of the utility vehicle is provided, wherein the vehicle control unit performs the function of the at least one second electronic control unit.

9. The electronic brake system of claim 1, further comprising:
- at least one parking brake; and
- at least one third valve, by which a fluid flow for actuating the parking brake is adjusted, wherein at least one second final control element is associated with the third valve and by which the at least one third valve is actuated.

10. The electronic brake system of claim 9, wherein the at least one third valve is actuated by the first electronic control unit.

11. The electronic brake system of claim 1, wherein the fluid is air or a liquid.

12. A utility vehicle with an electronic brake system, the electronic brake system comprising:
- a braking value encoder that includes at least one sensor for detecting positions of a brake pedal that is operable by a driver of the utility vehicle and includes at least one first valve that is mechanically actuated by the brake pedal, wherein, as a result of the mechanical actuation, the at least one first valve is moved from a pressure reduction position to at least one pressure maintenance position or pressure build-up position, wherein, in each of the pressure maintenance position and pressure build up position, the at least one first valve passes at least one fluid flow from a pressure source through the at least one first valve to actuate at least one service brake of the utility vehicle;
- at least one final control element associated with and controlling the at least one first valve, wherein the at least one final control element is different from the brake pedal, wherein, by operation of the at least one final control element, the at least one first valve is moved from the pressure reduction position to the at least one pressure maintenance position or pressure build-up position, wherein movement of the at least one first valve by the at least one final control element is independent of movement of the brake pedal;
- a first battery that stores and supplies electrical current;
- a first electronic control unit connected to the first battery and supplied with electrical current by the first battery;
- at least one electrically operated second valve actuated by the first electronic control unit depending on the position of the brake pedal detected by the at least one sensor, wherein actuation of the at least on electrically operated second valve adjusts the fluid flow for actuating the at least one service brake of the braking system;
- a second battery, which is different from the first battery, and stores and supplies electrical current; and
- at least one second electronic control unit, which is different from the first electronic control unit, and actuates the at least one final control element, wherein the second electronic control unit is connected to the second battery and is supplied with electrical current from the second battery, wherein the at least one first valve is coupled to the brake pedal by a coupling device, and wherein the coupling device is configured to allow movement of the at least one first valve relative to the brake pedal.

13. The utility vehicle of claim 12, wherein the at least one final control element is an electrically operated final control element.

14. The utility vehicle of claim 13, wherein the at least one final control element is an electromagnet.

15. The utility vehicle of claim 12, wherein the at least one final control element is connected to the second battery and is supplied with electrical current from the second battery.

16. The utility vehicle of claim 12, wherein the at least one sensor includes a first sensor and at least one second sensor for detecting the positions of the brake pedal, wherein the at least one second sensor is connected to the second battery and is supplied with electrical current from the second battery, wherein the first sensor is implemented to provide a first signal characterizing the respective detected positions and is coupled to the first electronic control unit, which detects the first signal, and wherein the at least one second sensor provides a second signal characterizing the respective detected positions and is coupled to the at least one second electronic control unit, which is implemented for detecting the second signal.

17. The utility vehicle of claim 12, further comprising a vehicle control unit for carrying out automatic driving of the utility vehicle, wherein the vehicle control unit performs the function of the at least one second electronic control unit.

18. The utility vehicle of claim 12, further comprising:
- at least one parking brake; and
- at least one third valve, by which a fluid flow for actuating the parking brake is adjusted, wherein at least one second final control element is associated with the third valve and by which the at least one third valve is actuated,
- wherein the at least one third valve is actuated by the first electronic control unit.

19. The electronic brake system of claim 1, wherein the coupling device includes a cylinder coupled to the brake pedal and a rod coupled to the at least on first valve, and wherein the rod is configured to move telescopically relative to the cylinder.

20. The utility vehicle of claim 12, wherein the coupling device includes a cylinder coupled to the brake pedal and a rod coupled to the at least on first valve, and wherein the rod is configured to move telescopically relative to the cylinder.

* * * * *